United States Patent
Alford et al.

(10) Patent No.: US 11,919,490 B2
(45) Date of Patent: Mar. 5, 2024

(54) HYDRAULIC MOTOR VEHICLE BRAKING SYSTEM AND METHOD FOR OPERATING SAME

(71) Applicant: ZF Active Safety GmbH, Koblenz (DE)

(72) Inventors: Nicholas Alford, Waldesch (DE); Andreas Marx, Hartenfels (DE); Oliver Wolf, Mayen (DE)

(73) Assignee: ZF Active Safety GmbH, Koblenz (DE)

( * ) Notice: Subject to any disclaimer, the term of this patent is extended or adjusted under 35 U.S.C. 154(b) by 611 days.

(21) Appl. No.: 17/046,880

(22) PCT Filed: Apr. 11, 2019

(86) PCT No.: PCT/EP2019/059311
§ 371 (c)(1),
(2) Date: Oct. 12, 2020

(87) PCT Pub. No.: WO2019/197555
PCT Pub. Date: Oct. 17, 2019

(65) Prior Publication Data
US 2021/0179051 A1   Jun. 17, 2021

(30) Foreign Application Priority Data
Apr. 12, 2018   (DE) .......................... 102018002990.6

(51) Int. Cl.
*B60T 13/66* (2006.01)
*B60T 8/1755* (2006.01)
(Continued)

(52) U.S. Cl.
CPC ............ *B60T 13/58* (2013.01); *B60T 8/1755* (2013.01); *B60T 8/176* (2013.01); *B60T 13/142* (2013.01);
(Continued)

(58) Field of Classification Search
CPC ................. B60T 13/686; B60T 13/745; B60T 2270/402; B60T 2270/413; B60T 2270/84;
(Continued)

(56) References Cited

U.S. PATENT DOCUMENTS 6,410,993 B1 *   6/2002   Giers ...................... B60T 8/321
                                                     303/20
11,046,330 B1 *   6/2021   Katzourakis .......... B60W 10/04
(Continued)

FOREIGN PATENT DOCUMENTS

DE       19717686 A1     10/1998
DE    102006014836 A1    10/2007
(Continued)

*Primary Examiner* — Bradley T King
(74) *Attorney, Agent, or Firm* — Robert James Harwood

(57) ABSTRACT

A hydraulic motor vehicle braking system includes a first functional unit, a second functional unit and a switching device. The first functional unit comprises at least one first valve arrangement designed to optionally connect or disconnect at least one first wheel brake associated with a first axle to or from an existing hydraulic pressure, and at least one second valve arrangement designed to optionally connect or disconnect at least one second wheel brake associated with a second axle to or from an existing hydraulic pressure. The second functional unit comprises at least one second electrical brake pressure generator, by means of which a brake pressure can be generated on at least the at least one second wheel brake, and a second control system which is designed to control the at least one second electrical brake pressure generator for a brake pressure regulation on at least the at least one second wheel brake in the event of a failure of the first functional unit.

15 Claims, 3 Drawing Sheets

(51) Int. Cl.
  *B60T 8/176* (2006.01)
  *B60T 13/14* (2006.01)
  *B60T 13/58* (2006.01)
  *B60T 13/68* (2006.01)
  *B60T 13/74* (2006.01)
  *B60T 17/22* (2006.01)
  *B60T 7/04* (2006.01)
  *B60T 8/40* (2006.01)

(52) U.S. Cl.
  CPC .......... *B60T 13/662* (2013.01); *B60T 13/686* (2013.01); *B60T 13/74* (2013.01); *B60T 17/221* (2013.01); *B60T 7/042* (2013.01); *B60T 8/4081* (2013.01); *B60T 2201/03* (2013.01); *B60T 2240/00* (2013.01); *B60T 2250/00* (2013.01); *B60T 2250/03* (2013.01); *B60T 2250/04* (2013.01); *B60T 2270/10* (2013.01); *B60T 2270/30* (2013.01); *B60T 2270/402* (2013.01); *B60T 2270/404* (2013.01); *B60T 2270/413* (2013.01); *B60T 2270/82* (2013.01)

(58) Field of Classification Search
  CPC ........ B60T 13/58; B60T 13/74; B60T 13/142; B60T 13/662; B60T 7/042; B60T 8/1755; B60T 8/176; B60T 2201/03; B60T 2270/10; B60T 2270/30; B60T 2270/404; B60T 2270/82
  See application file for complete search history.

(56) References Cited

U.S. PATENT DOCUMENTS

| | | | | |
|---|---|---|---|---|
| 11,066,055 | B2* | 7/2021 | Besier | B60T 8/4086 |
| 2002/0050739 | A1* | 5/2002 | Koepff | B60T 8/348 |
| | | | | 303/122.09 |
| 2010/0204894 | A1* | 8/2010 | Strengert | B60T 17/221 |
| | | | | 701/70 |
| 2011/0144878 | A1* | 6/2011 | Schneider | B60T 13/741 |
| | | | | 701/70 |
| 2011/0320099 | A1* | 12/2011 | Kim | B60T 8/885 |
| | | | | 701/70 |
| 2013/0282249 | A1* | 10/2013 | Heise | B60T 13/746 |
| | | | | 701/70 |
| 2016/0009263 | A1* | 1/2016 | Feigel | B60T 11/224 |
| | | | | 303/15 |
| 2016/0114779 | A1* | 4/2016 | Binder | B60T 8/171 |
| | | | | 701/76 |
| 2016/0339885 | A1* | 11/2016 | Linhoff | B60T 8/368 |
| 2017/0072920 | A1* | 3/2017 | Besier | B60T 8/4081 |
| 2018/0079398 | A1* | 3/2018 | Baehrle-Miller | B60T 13/588 |
| 2018/0334149 | A1* | 11/2018 | Feigel | B60T 13/148 |
| 2019/0031165 | A1* | 1/2019 | Besier | B60T 8/92 |
| 2019/0061727 | A1* | 2/2019 | Mizusaki | B60T 8/172 |
| 2019/0092297 | A1* | 3/2019 | Ayichew | B60T 7/16 |
| 2019/0308596 | A1* | 10/2019 | Besier | B60T 13/686 |
| 2019/0308601 | A1* | 10/2019 | Maj | B60T 7/042 |
| 2019/0322262 | A1* | 10/2019 | Kearney | B60T 13/74 |
| 2019/0344769 | A1* | 11/2019 | Zimmermann | B60T 8/326 |
| 2020/0039485 | A1* | 2/2020 | Satoh | B60T 8/17 |
| 2020/0039488 | A1* | 2/2020 | Rebholz-Goldmann | |
| | | | | B60T 8/1881 |
| 2020/0276963 | A1* | 9/2020 | Zimmermann | B60T 13/686 |
| 2020/0307538 | A1* | 10/2020 | Ganzel | B60T 8/4081 |
| 2020/0331442 | A1* | 10/2020 | Cheon | B60Q 9/00 |
| 2020/0339086 | A1* | 10/2020 | Grimm | B60T 13/66 |
| 2021/0031741 | A1* | 2/2021 | Alford | B60T 13/662 |
| 2021/0094523 | A1* | 4/2021 | Dinkel | B60T 8/343 |
| 2021/0114567 | A1* | 4/2021 | Rebholz-Goldmann | |
| | | | | B60T 8/171 |
| 2021/0146900 | A1* | 5/2021 | Einig | B60T 13/662 |
| 2021/0188237 | A1* | 6/2021 | Zimmermann | B60T 13/148 |
| 2022/0080935 | A1* | 3/2022 | Terada | B60T 8/92 |
| 2022/0131364 | A1* | 4/2022 | Wirth | G08C 19/02 |
| 2022/0169222 | A1* | 6/2022 | Ullrich | B60T 13/686 |
| 2022/0194339 | A1* | 6/2022 | Tarandek | B60T 8/326 |
| 2022/0340114 | A1* | 10/2022 | Marx | B60T 17/22 |
| 2023/0042679 | A1* | 2/2023 | Cheon | B60T 13/662 |

FOREIGN PATENT DOCUMENTS

| | | |
|---|---|---|
| DE | 102011108297 A1 | 8/2012 |
| DE | 102014221901 A1 | 4/2016 |
| DE | 102014225958 A1 | 6/2016 |
| DE | 102016203563 A1 | 9/2017 |
| DE | 112016001537 T5 | 1/2018 |
| DE | 102016213994 A1 | 2/2018 |

* cited by examiner

HYDRAULIC MOTOR VEHICLE BRAKING SYSTEM AND METHOD FOR OPERATING SAME

CROSS-REFERENCE TO RELATED APPLICATION

This application is a national stage of International Application No. PCT/EP2019/059311, filed Apr. 11, 2019, the disclosure of which is incorporated herein by reference in its entirety, and which claimed priority to German Patent Application No. 102018002990.6, filed Apr. 12, 2018, the disclosure of which is incorporated herein by reference in its entirety.

TECHNICAL FIELD

The present disclosure relates generally to the field of motor vehicle braking systems. Specifically, a hydraulic motor vehicle braking system and a method for operating same are described.

BACKGROUND

Conventional hydraulic motor vehicle braking systems according to the brake-by-wire (BBW) principle comprise an electrical brake pressure generator which, in normal braking mode, generates the brake pressure at the wheel brakes of the motor vehicle. For this purpose, a vehicle deceleration requested by the driver at a brake pedal is detected by sensors and converted into an activating signal for the electrical brake pressure generator.

In order still to be able to build up a brake pressure at the wheel brakes even in the event of failure of the electrical brake pressure generator, hydraulic braking systems according to the BBW principle generally additionally comprise a master cylinder, via which hydraulic fluid can likewise be delivered to the wheel brakes. In normal braking mode, the brake pedal is decoupled from the master cylinder, or the master cylinder is decoupled from the wheel brakes. A brake pressure is in this case built up at the wheel brakes solely by means of the electrical brake pressure generator. In emergency braking mode, on the other hand, that is to say, for example, in the event of failure of the electrical brake pressure generator, the decoupling is reversed. In this case, a brake pressure is generated at the wheel brakes by the driver himself by means of the brake pedal acting on the master cylinder.

The emergency braking mode is also referred to as push-through (PT) mode, owing to the reversed decoupling of the brake pedal and the master cylinder or of the master cylinder and the wheel brakes. The possibility given to the driver of being able to build up a brake pressure at the wheel brakes via the master cylinder in PT mode creates a redundancy which in many cases is indispensable for safety reasons.

Motor vehicle braking systems for autonomous or semi-autonomous driving must likewise be designed redundantly. However, it cannot be assumed in such cases that the driver is also in the vehicle (e.g. in a remote controlled parking, RCP, mode) or that the driver can immediately operate a brake pedal for the PT mode (e.g. if his gaze is averted from the driving process). In other words, the driver fails as a redundant element for brake pressure generation.

For this reason, it is required that a braking system for autonomous or semi-autonomous driving comprises, in addition to a functional unit that provides an electrically activatable main braking function, also a further functional unit that implements an electrically activatable secondary braking function in a redundant manner. The brake pedal and the master brake cylinder arranged downstream thereof can then be retained or omitted according to the safety requirements.

SUMMARY

The object underlying the present disclosure is to provide a hydraulic motor vehicle braking system which in a redundant manner comprises two electrical brake pressure generators and meets high safety requirements.

According to a first aspect there is provided a hydraulic motor vehicle braking system which comprises a first functional unit, a second functional unit and a switching device. The first functional unit comprises at least one first valve arrangement, which is configured either to connect at least one wheel brake, which is associated with a first axle, to a prevailing hydraulic pressure or to separate it therefrom, at least one second valve arrangement, which is configured either to connect at least one second wheel brake, which is associated with a second axle, to a prevailing hydraulic pressure or to separate it therefrom, at least one first electrical brake pressure generator, by means of which a brake pressure can be generated at each of the at least one first and the at least one second wheel brake, and a first controller, which is configured to activate the at least one first electrical brake pressure generator for a brake pressure regulation. The second functional unit comprises at least one second electrical brake pressure generator, by means of which a brake pressure can be generated at least at the at least one second wheel brake, and a second controller, which is configured to activate the at least one second electrical brake pressure generator for a brake pressure regulation at least at the at least one second wheel brake in the event of a malfunction of the first functional unit. The switching device is configured to couple either the first controller or the second controller with the at least one first valve arrangement in dependence on an operability of the first functional unit.

The at least one first valve arrangement and the at least one second valve arrangement can each comprise one or more valves. If only one valve is provided per valve arrangement, the valve arrangements can be activated in multiplex mode. The first valve arrangement and the second valve arrangement can each comprise an ABS isolation valve for either connecting the respective wheel brake to a prevailing hydraulic pressure or separating it therefrom.

The switching device can be activatable by the first functional unit or the second functional unit or by another component of the braking system for activating the switching device. The switching device can be a switchover device, which allows an activation path to be switched in such a manner that an activation signal can be fed to the at least one first valve device from only one of the two functional units.

The hydraulic pressure prevailing in the braking system can be generated in different ways. It is thus conceivable that the hydraulic pressure is generated by means of the first electrical brake pressure generator, by means of the second electrical brake pressure generator, or by the driver by means of a brake pedal and a master cylinder.

A malfunction of the first functional unit can be a total failure or a partial failure of the first functional unit. For example, the first electrical brake pressure generator or the first controller or another component of the first functional unit may fail. It is also conceivable that both the first electrical brake pressure generator and the first controller fail at the same time. The malfunction of the first functional unit can be detected by the first functional unit itself and signaled to the second functional unit. In addition or alternatively, the second functional unit can also be configured to detect a malfunction of the first functional unit.

The second functional unit can be designed to carry out in a redundant manner one, multiple or all the brake pressure regulation functions which the first functional unit is capable of carrying out. Examples of vehicle-stabilizing brake pressure regulation functions which can be carried out by the first and/or second functional unit include one or more of the following functions: anti-lock braking system, traction control, electronic stability control, and automatic distance control. The second functional unit can further be designed to activate the second electrical brake pressure generator within the context of in particular brake-pressure-regulated normal braking, also called service braking, if the first functional unit fails.

The wheel brakes can comprise front wheel brakes and rear wheel brakes. The wheel brakes at which the second electrical brake pressure generator is capable of generating a brake pressure can be a proper subset or an improper subset of the wheel brakes at which the first electrical brake pressure generator is capable of generating a brake pressure. In the case of an improper subset, the second electrical brake pressure generator is capable of generating a brake pressure at all the wheel brakes at which the first electrical brake pressure generator is also capable of generating a brake pressure. According to an example of a proper subset, the subset of the wheel brakes includes only the front wheel brakes of the motor vehicle. In this example, the wheel brakes of the rear wheels are thus not included in the subset of the wheel brakes.

The first functional unit can comprise a brake cylinder which can be coupled with a brake pedal. Furthermore, the first functional unit can be provided with a hydraulic switchover device for coupling either the first brake pressure generator or the master cylinder with at least one of the wheel brakes.

The two functional units can be logically and/or physically separated from one another. Functional units that are physically separated from one another can be accommodated in different housings or housing parts at least as far as some of their components are concerned. The different housings or housing parts can be directly fastened to one another, that is to say at least approximately without a gap, and thus regarded as two part-housings of a superordinate overall housing.

The switching device can be configured to couple the second controller with the at least one first valve arrangement in the event of a malfunction of the first functional unit. In addition or alternatively, the second controller can be configured to activate the at least one first valve arrangement in dependence on an associated wheel signal. The wheel signal can indicate a wheel velocity.

According to a variant, the second controller is configured to activate the at least one first valve arrangement within the context of ABS control in order to prevent an associated wheel from locking. The ABS control can include wheel-slip control, in particular in relation to a target slip. The target slip can be zero or other than zero.

The second controller can be configured to bring the at least one first valve arrangement into a closed position for a hydraulic pressure limitation at the associated first wheel brake. In this case, the corresponding first wheel brake is therefore separated from the prevailing hydraulic pressure. The prevailing hydraulic pressure to be limited can be generated in a master cylinder by a driver by means of a brake pedal. Alternatively, the prevailing hydraulic pressure to be limited can be generated by means of activation of the first electrical brake pressure generator by the second controller.

According to a variant, brake pressure cannot be generated at the at least one first wheel brake by means of the at least one second electrical brake pressure generator. For example, the braking system can be so designed that a brake pressure can be generated by means of the at least one second electrical brake pressure generator only at the at least one second wheel brake, which is associated with the second axle.

In one implementation, the switching device is configured as a transistor-based circuit. The switching device can be integrated into the first functional unit. For example, the first functional unit can comprise a control device into which the switching device is integrated. In general, the first controller and the second controller can be implemented as separate control devices.

The braking system can comprise at least one electrical parking brake actuator which is configured to generate a brake force at a vehicle wheel. In this case, the second controller can further be configured to activate the following individually or together: the at least one second electrical brake pressure generator and the at least one parking brake actuator.

The at least one electrical parking brake actuator can be associated with at least one vehicle wheel of the first axle. The second axle, on the other hand, may not have an associated electrical parking brake actuator. In this case, the braking system can be configured to generate a brake pressure at the at least one second wheel brake by means of the at least one second electrical brake pressure generator. In contrast, a brake pressure cannot be generated at the at least one first wheel brake by means of the at least one second electrical brake pressure generator.

The second controller can be configured to activate the at least one parking brake actuator in order to cause a vehicle deceleration in the event of a malfunction of the first functional unit. In this case, the vehicle deceleration can result solely from the closing of the at least one parking brake actuator (e.g. if the first and the second electrical brake pressure generators are not activated or are not activatable). Alternatively or in addition, the second controller can be configured to activate the at least one parking brake actuator in order to increase or reduce a prevailing vehicle deceleration in the event of a malfunction of the first functional unit. Thus, for example, by closing the at least one parking brake actuator, it is possible to increase a vehicle deceleration which is generated in a normal braking mode by the second electrical brake pressure generator or in a PT mode by the driver acting on the master cylinder. The second controller can also be configured to transfer the at least one parking brake actuator from a closed state into an open state in order to reduce a prevailing vehicle deceleration.

The second controller can be configured to activate the at least one parking brake actuator in order to increase the vehicle deceleration resulting from an activation of the second electrical brake pressure generator. In this case, the second controller can activate the at least one second electrical brake pressure generator and the at least one parking brake actuator together in order to achieve a high vehicle deceleration, for example in normal braking mode. Such a procedure is expedient, for example, when the second electrical brake pressure generator and the at least one parking brake actuator act on different vehicle axes.

The second controller can be configured to activate the at least one parking brake actuator in order to increase the vehicle deceleration which results from a brake pressure generated in a master cylinder by a driver by means of a brake pedal. Thus, for example, in PT mode, brake force boosting can take place by means of the at least one parking brake actuator. In this manner, a high vehicle deceleration can still be ensured even in the event of failure of the first and of the second electrical brake pressure generator.

The second controller can be configured to activate the at least one parking brake actuator when a driver operates a brake pedal in order to carry out normal braking. Activation of the at least one parking brake actuator by the second controller can, however, also take place independently of an operation of the brake pedal, for example in connection with a vehicle-stabilizing brake force regulation (for example in order to compensate for an oversteer or understeer of the vehicle).

In general, the second controller can be configured to activate the at least one parking brake actuator for a vehicle-stabilizing brake force regulation in particular in the event of a malfunction of the first functional unit (and an optionally simultaneous malfunction of the second electrical brake force generator). In this manner, a high availability of the brake pressure regulation functions listed by way of example above is ensured. The second controller can be configured to activate the at least one parking brake actuator together with the second electrical brake pressure generator for a vehicle-stabilizing brake force regulation. Such joint activation is expedient, for example, when the at least one parking brake actuator and the at least one second electrical brake pressure generator act on different vehicle wheels or different vehicle axes and brake pressure regulation is required at multiple wheels simultaneously.

The first controller can also be configured to activate the at least one parking brake actuator. In other words, a specific parking brake actuator can be activatable both by the first controller and by the second controller. Activation of the at least one parking brake actuator by the first controller can take place in connection with a regular parking brake mode.

The first controller and the second controller can be implemented by means of a redundant microprocessor system. In particular, the first controller and the second controller can be implemented in separate control devices each having an associated microprocessor system.

According to a variant, the wheel brakes at which the first electrical brake pressure generator is capable of generating a brake pressure include the front wheel brakes and the rear wheel brakes. According to this variant, the subset of the wheel brakes at which the second electrical brake pressure generator is capable of generating a brake pressure can include only the front wheel brakes (and not the rear wheel brakes). In addition or alternatively, at least two electrical parking brake actuators are present, each of which is capable of generating a brake force only at front wheels or only at rear wheels.

The generation of the brake force by the at least one electrical parking brake actuator can be based on a mechanical or a hydraulic principle. According to a variant, the at least one electrical parking brake actuator is an electromechanical parking brake actuator.

There is likewise provided a method for operating a hydraulic motor vehicle braking system which comprises a first functional unit and a second functional unit. The at least one first functional unit comprises at least one first valve arrangement, which is configured either to connect at least one first wheel brake, which is associated with a first axle, to a prevailing hydraulic pressure or to separate it therefrom, at least one second valve arrangement, which is configured either to connect at least one second wheel brake, which is associated with a second axle, to a prevailing hydraulic pressure or to separate it therefrom, at least one first electrical brake pressure generator, by means of which a brake pressure can be generated at each of the at least one first and the at least one second wheel brake, and a first controller, which is configured to activate the at least one first electrical brake pressure generator for a brake pressure regulation. The second functional unit comprises at least one second electrical brake pressure generator, by means of which a brake pressure can be generated at least at the at least one second wheel brake, and a second controller, which is configured to activate the at least one second electrical brake pressure generator for a brake pressure regulation at least at the at least one second wheel brake in the event of a malfunction of the first functional unit. The method comprises the step of coupling either the first controller or the second controller with the at least one first valve arrangement in dependence on an operability of the first functional unit.

The method can comprise one or more further steps, as described above and hereinbelow.

There is further provided a computer program product which comprises program code for carrying out the method presented herein when the program code is executed on a motor vehicle control device.

There is likewise provided a motor vehicle control device or control device system (comprising multiple control devices), wherein the control device or control device system has at least one processor and at least one memory and wherein the memory comprises program code which, when it is executed by the processor, causes the steps of the method indicated herein to be carried out.

BRIEF DESCRIPTION OF THE DRAWINGS

Further aspects, details and advantages of the present disclosure will become apparent from the following description of exemplary embodiments with reference to the figures, in which.

DETAILED DESCRIPTION

Figure 1:
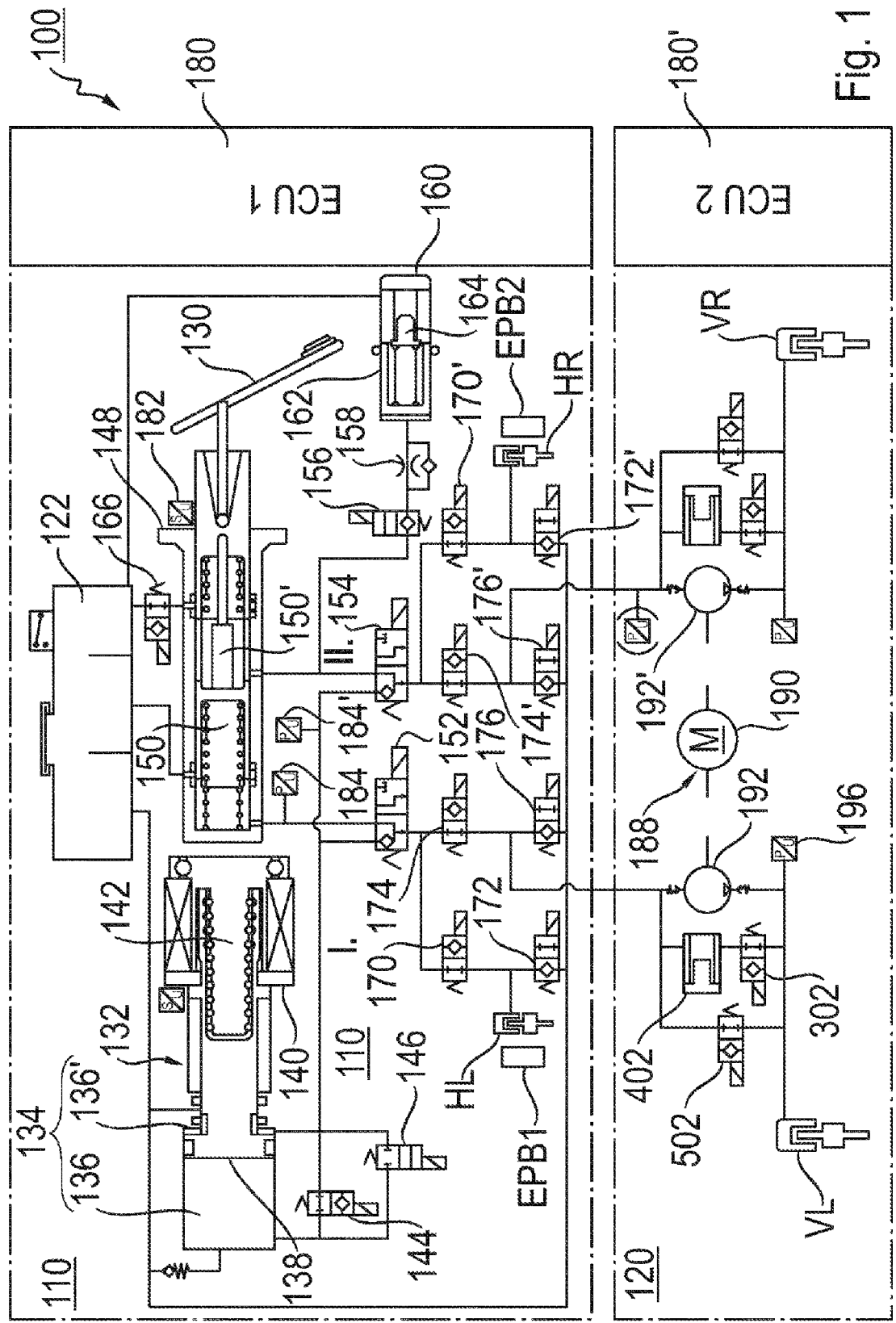
FIG. 1 shows an exemplary embodiment of a hydraulic motor vehicle braking system.

FIG. 1 shows the hydraulic circuit diagram of a first exemplary embodiment of a hydraulic motor vehicle braking system 100 according to the BBW principle. The braking system 100 is configured to be suitable for either an autonomous or a semi-autonomous driving mode.

As is shown in FIG. 1, the braking system 100 comprises a first functional unit 110, which provides an electrically activatable main braking function, and a second functional unit 120, which in a redundant manner implements an electrically activatable secondary braking function. While the first functional unit 110 is configured to build up a brake pressure at two front wheel brakes VL, VR and two rear wheel brakes HL, HR of a two-axle motor vehicle, the second functional unit 120 is configured to build up a brake pressure at only the two wheel brakes VL, VR of the front wheels. In alternative exemplary embodiments, the second functional unit 120 could be configured to build up a brake pressure at only the two wheel brakes HL, HR of the rear wheels, at all four wheel brakes VL, VR, HL, HR, or at two diagonally opposite wheel brakes VL/HR or VR/HL.

The first functional unit 110 is designed to carry out a wheel brake pressure regulation, decoupled from a driver's braking intention, at one or more of the wheel brakes VL, VR, HL, HR. The second functional unit 120 can carry out at least some wheel brake pressure regulation functions of the first functional unit 110 in a redundant manner at the wheel brakes VL and VR.

The two functional units 110, 120 can be accommodated as separate modules in separate housing units. As required, the first functional unit 100 can thus be installed either on its own or in combination with the second functional unit 120.

As is likewise apparent from FIG. 1, the braking system 100 comprises two electrical parking brake actuators EPB1, EPB2. In the exemplary embodiment, a first parking brake actuator EPB1 is associated with the left rear wheel and a second parking brake actuator EPB2 is associated with the right rear wheel. In other exemplary embodiments, the parking brake actuators EPB1, EPB2 are associated with the front wheels. It is also possible for a parking brake actuator to be provided at all four wheels. The parking brake actuators EPB1, EPB2 can be integrated in a modular unit with the wheel brakes HL, HR.

Each of the parking brake actuators EPB1, EPB2 comprises an electric motor and a gear arranged downstream of the electric motor. The gear converts a rotational movement of the electric motor into a translational movement of a brake piston of one of the wheel brakes HL, HR. In this manner, the brake piston can be brought into contact with an associated brake disk in order to generate a brake force.

Referring to FIG. 1, the braking system 100 operates by means of a hydraulic fluid, which is stored in part in a pressureless reservoir 122. Brake pressures at the wheel brakes VL, VR, HL, HR can be generated by means of the first functional unit 110 and the second functional unit 120 independently of one another by pressurizing the hydraulic fluid.

The first functional unit 110 comprises a first electrical brake pressure generator 132 for generating brake pressure in BBW mode autonomously, semi-autonomously or as requested by the driver at a brake pedal 130. In the exemplary embodiment, this brake pressure generator 132 comprises a double-acting cylinder-piston arrangement 134 according to the plunger principle having two cylinder chambers 136, 136' and a piston 138 which is movable therein. The piston 138 of the brake pressure generator 132 is driven by an electric motor 140 via a gear 142. In the exemplary embodiment, the gear 142 is configured to convert a rotational movement of the electric motor 140 into a translational movement of the piston 138. In another exemplary embodiment, the brake pressure generator 132 could also be configured as a single-acting cylinder-piston arrangement with only one cylinder chamber.

The two cylinder chambers 136, 136' can be coupled both with the reservoir 122 and with two brake circuits I. and II., wherein each brake circuit I. and II. in turn supplies two wheel brakes VL, HL or VR, HR, respectively. It is also possible to allocate the four wheel brakes VL, VR, HL, HR to the two brake circuits I. and II. differently (e.g. a diagonal split).

In the present exemplary embodiment, two valves 144, 146 which are actuated by electromagnets and connected in parallel with one another are associated with the electric brake pressure generator 132. The valve 144 serves, in accordance with the double-action principle, to fluidically couple one of the chambers 136, 136' with the two brake circuits I. and II., while the other of the chambers 136, 136' draws in hydraulic fluid from the reservoir 122. The optional valve 146 can be activated in connection with ventilation of the hydraulic system or other operations. In the unactuated, that is to say electrically non-activated state, the valves 144, 146 assume the normal positions shown in FIG. 1. This means that the valve 144 assumes its flow-through position and the valve 146 assumes its blocking position, so that, on a forward stroke (to the left in FIG. 1), the piston 138 displaces hydraulic fluid from the front chamber 136 into the two brake circuits I. and II. In order to displace hydraulic fluid from the rear chamber 136' into the two brake circuits I. and II. on a reverse stroke (to the right in FIG. 1) of the piston 138, only the valve 144 is activated, that is to say transferred into its blocking position.

For generating brake pressure in PT mode, the first functional unit 110 further comprises a master cylinder 148 which is to be actuated by the driver by the pedal 130. The master cylinder 148 in turn comprises two chambers 150, 150', wherein the first chamber 150 is coupled with the first brake circuit I. and the second chamber 150' is coupled with the second brake circuit II.

By means of the master cylinder 148, the two brake circuits I. and II. can be supplied with pressurized hydraulic fluid (in a redundant manner to the electrical brake pressure generator 132). For this purpose there are provided two valves 152, 154 which are actuated by electromagnets and which in the unactuated, that is to say the electrically non-activated, state assume the normal positions shown in FIG. 1. In these normal positions, the valves 152, 154 couple the master cylinder 148 with the wheel brakes VL, VR, HL, HR. Thus, even in the event of failure of the power supply (and an associated failure of the electrical brake pressure generator 132), a hydraulic pressure can still be built up at the wheel brakes VL, VR, HL, HR by the driver by means of the brake pedal 130 acting on the master cylinder 148 (PT mode).

In BBW mode, on the other hand, the valves 152, 154 are so connected that the master cylinder 148 is fluidically decoupled from the two brake circuits I. and II., while the electrical brake pressure generator 132 is coupled with the brake circuits I. and II. With the master cylinder 148 decoupled from the brake circuits I. and II., when the brake pedal 130 is operated the hydraulic fluid displaced from the master cylinder 148 is thus delivered not into the brake circuits I. and II. but via a 2/2-way valve 156, actuated by an electromagnet, and a throttle device 158 into a simulator 160. In its electrically non-activated normal position in BBW mode, the valve 156 assumes the position shown in FIG. 1, in which the main cylinder 148 is uncoupled from the simulator 160, so that hydraulic fluid can be delivered into the brake circuits I. and II.

The simulator 160 is provided for imparting to the driver the usual pedal reaction behavior when the master cylinder 148 is hydraulically uncoupled from the brake circuits I. and II. In order to be able to receive hydraulic fluid from the master cylinder 148, the simulator 160 comprises a cylinder 162 in which a piston 164 can be moved against a spring force.

A further 2/2-way valve 166, actuated by an electromagnet, between the master cylinder 148 and the reservoir 122 makes it possible, in its electrically non-activated normal position according to FIG. 1, for hydraulic fluid to pass from the reservoir 122 into the master cylinder 148 in PT mode.

In its electrically activated position, on the other hand, the valve 166 uncouples the master cylinder 148 from the reservoir 122.

In other exemplary embodiments, the functional decoupling of the brake pedal 130 and the wheel brakes VL, VR, HL, HR can also be achieved by providing upstream of the master cylinder 148 a cylinder on which the brake pedal 130 can act. This cylinder is coupled in BBW mode with the simulator 160 via the valve 156 and the throttle device 158, and is coupled in PT mode with the master cylinder 148.

The hydraulic coupling of the wheel brakes VL and VR is determined by 2/2-way valves 170, 172, 174, 176 and 170', 172', 174', 176' which are actuated by electromagnets and which, in the unactuated, that is to say electrically non-activated, state, assume the normal positions shown in FIG. 1. This means that the valves 170, 174 and 170', 174' each assume their flow-through position and the valves 172, 176 and 172', 176' each assume their blocking position. Since the two brake circuits I. and II. are symmetrical, the components associated with the second brake circuit II., or the wheel brakes HL and HR, will not be described here and in the following.

As is shown in FIG. 1, the second functional unit 120 is arranged in the fluid path between the valves 174, 176 and the wheel brake VL (and, for reasons of symmetry, the same applies to the wheel brake VR). When the first functional unit 110 is fully operational and/or in PT mode, the second functional unit 120 assumes an open position. This means that hydraulic fluid leaving the first functional unit 110 is able to pass unhindered to the wheel brakes VL, VR. For executing normal braking there is therefore, in the normal position of the valves 170, 172, 174, 176 shown in FIG. 1, a direct hydraulic connection between the electrical brake pressure generator 132 (or, according to the position of the valves 152, 154, the master cylinder 148), on the one hand, and on the other hand the wheel brakes HL or VL of the first brake circuit I. (and the same applies for the wheel brakes HR or VR of the second brake circuit II.).

The two valves 170 and 172 form a valve arrangement associated with the wheel brake HL, while the two valves 174 and 176 form a valve arrangement associated with the wheel brake VL. From the point of view of the electrical brake pressure generator 132, the second functional unit 120 is thus provided downstream of the valve arrangement 174, 176 and connected between that valve arrangement 174, 176 and the associated wheel brake VL.

As will be explained hereinbelow, the two valve arrangements 170, 172 and 174, 176 associated with the wheel brakes HL and VL, and also the brake pressure generator 132, are each configured to be activated for wheel brake pressure regulation operations at the respective wheel brake HL or VL. A control device 180 (also referred to as an electronic control unit, ECU) provided for activation of the valve arrangements 170, 172 and 174, 176 and of the brake pressure generator 132 within the context of the wheel brake pressure regulation operations is likewise shown schematically in FIG. 1. The control device 180 is part of the first functional unit 180 and implements, for example, the vehicle-stabilizing wheel brake pressure regulation functions of an anti-lock braking system (ABS), of a electronic stability control system (ESC), of a traction control system (TCS) or of an adaptive cruise control system (ACC). Instead of a single control device 180 it is of course also possible to provide a plurality of such control devices which are responsible for different wheel brake pressure regulation functions (optionally in a complementary or in a redundant manner).

The second functional unit 120 likewise comprises a control device 180' which, for redundancy reasons, is provided separately from the control device 180 and likewise implements one or more (or all) of the above-mentioned vehicle-stabilizing brake pressure regulation functions. In addition or alternatively to the provision of separate control devices 180, 180', it would also be possible to provide two redundant electric power supplies and/or separate electric power supplies for the two functional units 110, 120. These power supplies can be configured as two accumulators.

In the case of anti-lock braking (ABS), the wheels are to be prevented from locking during braking. For this purpose it is necessary to modulate the brake pressure in the wheel brakes VL, VR, HL, HR individually. This is carried out by establishing in temporal succession alternate pressure build-up, pressure maintenance and pressure reduction phases, which are obtained by suitable activation of the valve arrangements 170, 172 and 174, 176 associated with the wheel brakes HL and VL, and optionally of the brake pressure generator 132.

During a pressure build-up phase, the valves 170, 172 and 174, 176 each assume their normal position, so that an increase of the brake pressure in the wheel brakes HL and VL (as in the case of BBW braking) takes place by means of the brake pressure generator 132. For a pressure maintenance phase, only the valve 170 or 174 is activated, that is to say transferred into its blocking position. Since the valve 172 or 176 is not activated, it remains in its blocking position. As a result, the wheel brake HL or VL is hydraulically uncoupled, so that a brake pressure prevailing in the wheel brake HL or VL is kept constant. In a pressure reduction phase, both the valve 170 or 174 and the valve 172 or 176 is activated, that is to say the valve 170 or 174 is transferred into its blocking position and the valve 172 or 176 is transferred into its flow-through position. Hydraulic fluid is accordingly able to flow from the wheel brake HL or VL in the direction towards the reservoir 122, in order to lower a brake pressure prevailing in the wheel brake HL or VL.

Other brake pressure regulation operations in normal braking mode take place automatically and typically independently of an operation of the brake pedal 130 by the driver. Such automatic regulations of the wheel brake pressure take place, for example, in connection with a traction control system (TCS), which prevents individual wheels from spinning when setting off by targeted braking, an electronic stability control system (ESC), which adapts the vehicle behavior on the stability limit to the driver's intention and the road conditions by targeted braking of individual wheels, or an adaptive cruise control system (ACC), which maintains a distance between one's own vehicle and a vehicle in front inter alia by automatic braking.

When performing an automatic wheel brake pressure regulation, a brake pressure can be built up at least at one of the wheel brakes HL or VL by activation of the brake pressure generator 132 by the control device 180. The valves 170, 172 or 174, 176 associated with the wheel brakes HL or VL thereby first of all assume their normal positions illustrated in FIG. 1. A fine adjustment or modulation of the brake pressure can be carried out by corresponding activation of the brake pressure generator 132 and of the valves 170, 172 or 174, 176 associated with the wheel brakes HL or VL, as explained above by way of example in connection with ABS control.

Brake pressure regulation by means of the control device 180 generally takes place in dependence on one or more measured variables describing the vehicle behavior (e.g.

wheel speed, yaw velocity, transverse acceleration, etc.) and/or one or more measured variables describing the driver's intention (e.g. operation of the pedal 130, steering wheel angle, etc.). A deceleration intention of the driver can be determined, for example, by means of a travel sensor 182 which is coupled with the brake pedal 130 or an input member of the master brake cylinder 148. Alternatively or in addition, there may be used as the measured variable describing the drivers intention the brake pressure generated by the driver in the master brake cylinder 148, which is then detected by means of at least one sensor. In FIG. 1, each of the brake circuits I. and II. has its own associated pressure sensor 184, 184' for this purpose.

As discussed above, from the point of view of the brake pressure generator 132, the second functional unit 120 is provided downstream of the valve arrangement 174, 176 and is connected between the valve arrangement 174, 176 and the associated wheel brake VL. Specifically, a hydraulic fluid inlet of the second functional unit 120 is coupled between an outlet of the valve 174 and an inlet of the valve 176 (when viewed in the direction of flow from the pressure generator 132 to the reservoir 122).

As is shown in FIG. 1, the second functional unit 120 comprises a further electrical brake pressure generator 188. The further brake pressure generator 188 is activatable by the control device 180' and comprises in the exemplary embodiment an electric motor 190 and also, for each brake circuit I. and II. (here: for each wheel brake VL or VR), a pump 192, 192' configured, for example, as a gear-wheel pump or a radial-piston pump. In the exemplary embodiment, each pump 192, 192' is blocking contrary to its delivery direction, as shown by the (optional) shut-off valves at the outlet and inlet of the pumps 192, 192'. The pumps 192, 192' are each configured to draw hydraulic fluid from the reservoir 122 via the first functional unit 110. Since the speed of the electric motor 190 is adjustable, the delivery rate of the pumps 192, 192' can also be adjusted by means of corresponding activation of the electric motor 190. In another embodiment, the two pumps 192, 192' could also be replaced by a single pump working by the plunger principle (for example with a single- or double-acting cylinder-piston arrangement).

The second functional unit 120 is also symmetrical with respect to the brake circuits I. and II. Therefore, only the components of the second functional unit 120 that are associated with the first brake circuit I. (here: the wheel brake VL) will be explained in greater detail hereinbelow. These components include a pressure sensor 196, which allows the pressure generator 188 (and thus the pump 192) to be activated to a target pressure value. The pressure evaluation and the activation of the pressure generator 188 take place, as explained above, by the control device 180'. An optional pressure sensor (not shown) provided on the input side of the second functional unit 120 could be provided for detecting braking of the driver (e.g. via the master cylinder 148) in the active second functional unit 120. In this manner, an ACC regulation just carried out by the second functional unit 120, for example, could be terminated in favor of emergency braking of the vehicle to a standstill.

If a malfunction of the first functional unit 110 is detected (e.g. on the basis of a failure of the pressure generator 132 or of a leak in the region of the first functional unit 110), the second functional unit 120 can undertake brake pressure generation and in particular brake pressure regulation at the wheel brakes VL and VR in a redundant manner to the first functional unit 110. For example, one or more of the following (or other) brake pressure regulation functionalities can be carried out autonomously by means of the second functional unit 120 in the event of failure of the first functional unit 110: brake force boosting, ABS, ESC, TCS and ACC.

The redundancy created with the second functional unit 120 therefore makes it possible to use the motor vehicle braking system 100 shown in FIG. 1 also for the applications of semi-autonomous or autonomous driving. In particular in the latter application, the master cylinder 148 and its associated components (such as the brake pedal 130 and the simulator 160) could also be omitted completely.

The two functional units 110, 120 share a hydraulic system (namely the first functional unit 110 with the reservoir 122). The second functional unit 120 is thus also operated entirely with hydraulic fluid from the reservoir 122 and feeds the hydraulic fluid back into that reservoir 122. When the second functional unit 120 is being used, the pump 192 therefore draws fluid directly from the reservoir 122 via the corresponding connection on the input side to the first functional unit 110 via that functional unit (and the correspondingly opened valve 176).

A bypass valve 302, which in the exemplary embodiment is configured as a 2/2-way valve actuated by an electromagnet, is connected parallel to the pump 192. In the unactuated, that is to say electrically non-activated state, this valve 302 assumes the normal position shown in FIG. 1. Normal position here means that the valve 302 assumes its flow-through position. In this manner, hydraulic fluid can be delivered from the first functional unit 110 to the wheel brake VL and flow back again to the first functional unit 110 (and to the reservoir 122). The valve 302 is activated by the control device 180'.

In the electrically activated state, the valve 302 assumes its blocking position, such that hydraulic fluid delivered by the pump 192 reaches the wheel brake VL and cannot escape to the first functional unit 110. Such an escape (in the open position of the valve 302) may, however, be desirable within the context of a pressure regulation on the part of the second functional unit 120, if brake pressure has to be reduced at the wheel brake VL (e.g. within the context of ABS control). Since the valve 302 in its blocking position blocks on only one side in the exemplary embodiment, the brake pressure at the wheel brake VL can still be increased by means of the first functional unit 110 (e.g. on actuation of the master cylinder 148 in PT mode).

Furthermore, the second functional unit 120 comprises an optional accumulator 402, which provides additional hydraulic fluid volume for drawing in by the pump 192. The background to this storage of additional hydraulic volume is the fact that the suction path of the pump 192 through the first functional unit 110 could not provide hydraulic fluid volume sufficiently quickly, especially at low temperatures. Depending on the design of the functional units 110, 120, the provision of additional hydraulic fluid volume may also be desirable generally (optionally independently of the temperature) to assist with a rapid pressure build-up at the wheel brake VL.

In the present exemplary embodiment, the accumulator 402 is configured as a pressure accumulator, specifically as a spring-loaded piston-type accumulator. The pressure accumulator 402 could also be a membrane accumulator or a piston sealed with a rolling bellows. The pressure accumulator 402 is arranged, in such a manner that flow is possible therethrough, between the inlet of the pump 192 and the hydraulic interface with the first functional unit 110 on the one hand and the valve 302 on the other hand. The flow-through arrangement permits simple ventilation and simple exchange of the hydraulic fluid within the context of a regular service.

In other exemplary embodiments, the accumulator 402 can be a fluid accumulator configured as a piston-type accumulator, which manages without a return spring. This piston-type accumulator is provided in a fluid path between the pump 192 and the valve 302 on the one hand and the first functional unit 110 and the second valve 502 on the other hand. The piston-type accumulator can be provided with a lip seal, which is capable of undertaking sealing of the piston with respect to atmospheric pressure. However, as already mentioned at the beginning, there is no return spring or similar element for urging the piston of the piston-type accumulator into its storage position again after the piston-type accumulator has been partially or completely emptied. The storage position corresponds to the position in which the piston-type accumulator is filled substantially to the maximum with hydraulic fluid.

When hydraulic fluid is drawn out of the piston-type accumulator by the pump 192, the piston thereof then moves out of its storage position into a withdrawal position. In order subsequently to urge the piston from this withdrawal position back into its storage position again, it is provided that a hydraulic fluid flowing back from the pressurized wheel brake VL, VR in the direction towards the first functional unit 110 is capable of urging the piston into its storage position. For this purpose, the valve 502 is closed and the valve 302 is opened, so that the hydraulic fluid flowing back is able to pass into the piston-type accumulator. The piston thereof is thereby displaced against atmospheric pressure until a line to the first functional unit 110, which line communicates with the cylinder of the piston-type accumulator, is freed. A spring-loaded non-return valve can be provided in this line, which allows hydraulic fluid to flow back to the first functional unit 110 but has a blocking action in the opposite direction. The opening pressure for opening the non-return valve is chosen to be comparatively low and is less than 1 bar (e.g. 0.5 bar).

Parallel to the line between the piston-type accumulator and the first functional unit 110 in which the non-return valve is accommodated there can be provided in a further line between the first functional unit 110 and the piston-type accumulator a second non-return valve which is arranged inversely to the first non-return valve. This second non-return valve allows hydraulic fluid to be drawn by means of the pump 192 from the first functional unit 110 through the piston-type accumulator (and has a blocking action in the opposite direction). The line with the second non-return valve is attached to the cylinder of the piston-type accumulator axially offset with respect to the line with the first non-return valve, so that, in any position of the piston thereof, hydraulic fluid can be drawn from the first functional unit 110 through the cylinder.

The second functional unit 120 further comprises an optional further bypass valve 502, which is arranged parallel to the bypass valve 302 and is switched together therewith. The valve 502, which in the exemplary embodiment is configured as an electromagnetically actuated 2/2-way valve, assumes the normal position shown in FIG. 1 in the unactuated, that is to say electrically non-activated, state. Normal position here means, as with the valve 302, that the valve 502 assumes its flow-through position. The valve 502 is activatable by the control device 180.

Thus, via the open valve 502, hydraulic pressure at the wheel brake VL can still be reduced even if the bypass valve 302 is incorrectly closed or in the case of a blocking error of the flowed-through pressure accumulator 402. In addition, the flow resistance from the first functional unit 110 to the wheel brake VL is reduced by the two valves 302 and 502 connected in parallel, so that the so-called "time to lock" of that wheel brake VL is also reduced in the case of a required rapid pressure build-up at the wheel brake VL. It will be appreciated that this is equally the case with the wheel brake VR. In general, all the statements made in connection with the exemplary embodiments as regards the wheel brake VL also apply to the wheel brake VR owing to the symmetrical design of the braking system 100.

According to the exemplary embodiment of FIG. 1, only the two front wheel brakes VL, VR are connected to the second functional unit 120. In other exemplary embodiments, all four wheel brakes VL, VR, HL, HR are connected to the second functional unit 120. The second functional unit 120 is then capable of carrying out a brake pressure build-up (and in particular a brake pressure regulation) at all these wheel brakes VL, VR, HL, HR. For this purpose, a hydraulic fluid inlet of the second functional unit 120, for example for the left rear wheel HL, can be coupled between an outlet of the valve 170 and an inlet of the valve 172 (when viewed in the direction of flow from the pressure generator 132 to the reservoir 122).

While FIG. 1 primarily shows the hydraulic layout of the braking system 100, the electronic layout of the braking system 100 and in particular the electrical activation of some of the components installed in the braking system 100 will now be explained in greater detail with reference to FIG. 2. The same reference numerals denote the same or corresponding components. It should be noted that the electronic layout shown in FIG. 2 can also be used in braking systems that are different from the braking system 100 shown in FIG. 1.

FIG. 2 first of all again shows the division of various components of the braking system 100 between a first functional unit 110 and a second functional unit 120. The hydraulic components of the first functional unit 110, such as, for example, the valves thereof and also the brake pressure generator 132, are combined into a first hydraulic system HS1. In the same manner, the corresponding components of the second functional unit 120, such as the valves thereof and the brake pressure generator 188, are combined into a second hydraulic system HS2. Particular prominence is given to the two valves 170, 170' of the hydraulic system HS1 and also the pressure sensor 196 of the hydraulic system HS2, which will be discussed in greater detail hereinbelow.

For each of the control devices 180, 180', prominence is given to the important software functions. Thus, the microprocessor system of the control device 180 is designed to implement the software functions of a basic brake 180A, of stability control 180B and of an actuator control 180C. Similarly, the microprocessor system of the control device 180' is designed to implement the software functions of a basic brake 180'A, of stability control 180'B and of an actuator control 180'C. The basic braking functions 180A, 180'A are configured to activate the hydraulic system HS1 or HS2 in connection with normal braking. The stability control functions 180B, 180'B permit inter alia an activation of the respective associated brake pressure generator 132 or 188 in connection with a vehicle-stabilizing brake pressure regulation (as already discussed with reference to FIG. 1). Finally, the actuator control functions 180C, 180'C permit an electrical activation of the two parking brake actuators EPB1 and EPB2. These parking brake actuators EPB1, EPB2 are each shown in FIG. 2 installed with the associated hydraulic wheel brake HL or HR to form a single wheel brake unit.

Figure 2:
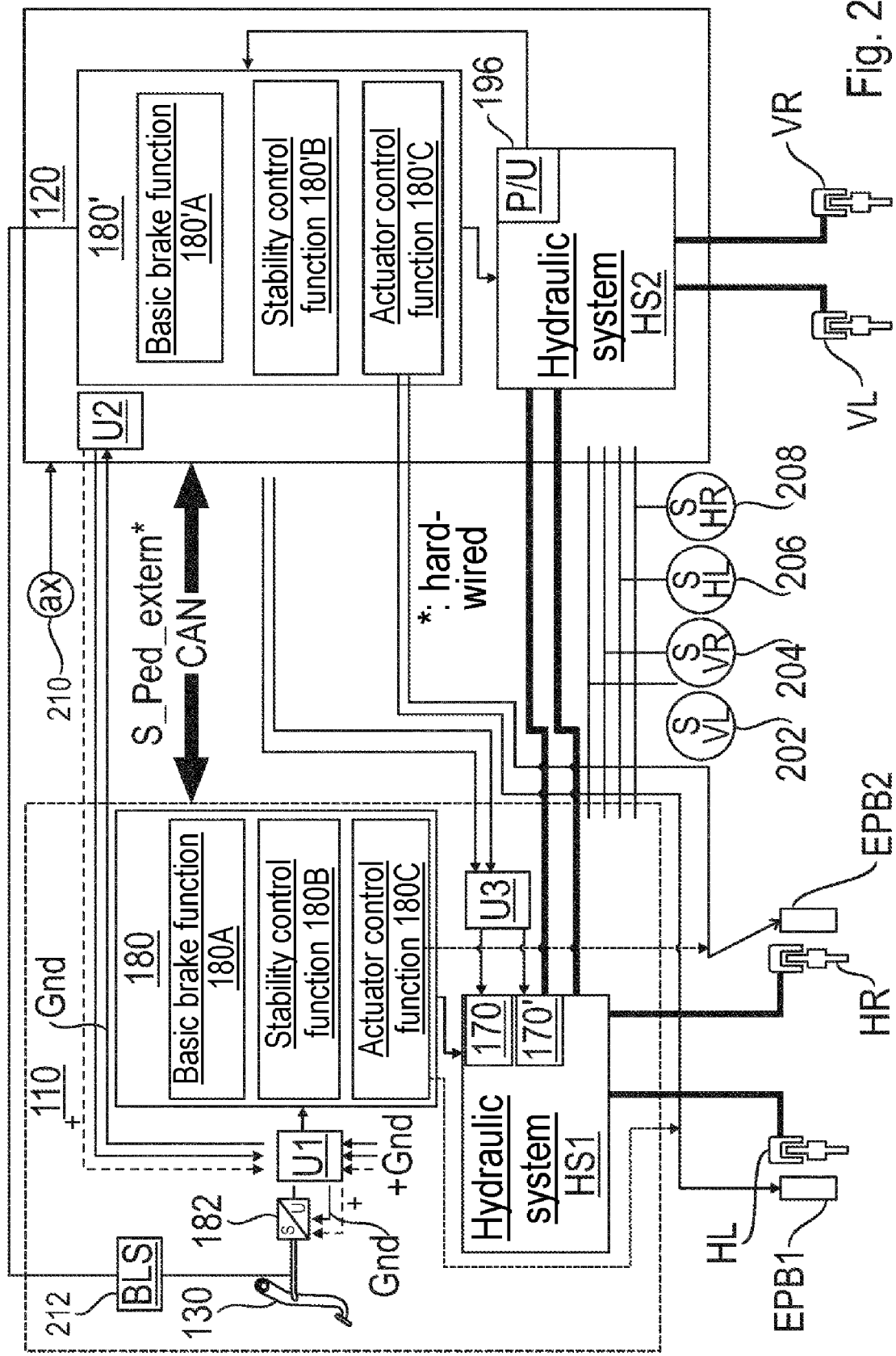
FIG. 2 is an illustration of activation aspects in connection with the braking system according to FIG. 1.

In FIG. 2, multiple sensors of the braking system 100 are further illustrated. In addition to the pedal travel sensor 182 and the pressure sensor 196, which have already been discussed with reference to FIG. 1, the braking system 100 further comprises four wheel sensors 202, 204, 206, 208. These wheel sensors 202, 204, 206, 208 are each associated with one of the four vehicle wheels and allow the corresponding wheel speed or wheel velocity to be determined. An acceleration sensor 210 detects the longitudinal acceleration ax of the vehicle, and a brake light switch 212 in known manner generates a brake light signal when the brake pedal 130 is operated.

The braking system 100 additionally comprises multiple switching devices U1, U2, U3. The two switching devices U1, U3 are part of the first functional unit 110 and can also be integrated into the control device 180. The switching device U2 is part of the second functional unit 120 and can also be integrated into the control device 180'.

Various aspects connected to the activation of the parking brake actuators EPB1, EPB2 by the control device 180' will be explained hereinbelow. As already mentioned above, the second control device 180' is capable of activating individually or together the brake pressure generator 188 (by means of the basic brake function 180 A' or the stability control function 180'13) and one or both of the parking brake actuators EPB1, EPB2 (by means of the actuator control function 180'C). In general, activation of one or both of the parking brake actuators EPB1, EPB2 by the control device 180' takes place at a fallback level, that is to say in the case of a malfunction of the first functional unit 110 (for example in the event of failure of the control device 180). The activation of one or both of the parking brake actuators EPB1, EPB2 can take place inter alia in order to cause, increase or reduce a vehicle deceleration or in order to increase or reduce a wheel velocity in a wheel-specific manner. Characteristic therefor is that the vehicle is moving (for example with a velocity of more than 10 km/h) when one or both of the parking brake actuators EPB1, EPB2 are activated by the control device 180'. In addition, the control device 180' in some implementations can also activate the two parking brake actuators EPB1, EPB2 when the vehicle is stationary. This makes possible a conventional parking brake operation for parking the vehicle even in the event of a malfunction of the first functional unit 110.

Various scenarios are described hereinbelow of how one or both of the parking brake actuators EPB1, EPB2 are activated, together with or independently of the brake pressure generator 188, by the control device 180' in the event of a malfunction of the first functional unit 110.

The first activation scenario relates to ABS control at one or both wheels of the front axle and also at one or both wheels of the rear axle. In order to carry out ABS control at a fallback level at a front wheel, the brake pressure generator 188 (and/or further components of the hydraulic system HS2) is activated by means of the stability control function 180'B. In this manner, the wheel slip at the wheel brake VL of the left front wheel and/or the wheel brake VR of the right front wheel can be controlled. This slip control by the stability control function 180'B is based on the front wheel velocities, as are provided by the two wheel sensors 202, 204.

Since the brake pressure generator 188 according to the hydraulic layout shown in FIG. 1 is not capable of building up a brake pressure at the rear wheel brakes HL, HR, the slip control at the two rear wheels takes place by activation of one or both of the parking brake actuators EPB1, EPB2 by the control device 180'. The slip control is carried out by the stability control function 180'B on the basis of the rear wheel velocities, as received from the wheel sensors 206, 208. On the basis of an evaluation of the rear wheel velocities, the stability control function 180'B then generates activation signals for the actuator control 180'C, which in turn is capable of activating the parking brake actuators EPB1, EPB2 individually or together. It should be noted that such a slip control at the rear wheels still remains possible even in the event of failure of the hydraulic system HS2.

A second activation scenario for a vehicle-stabilizing brake force regulation is an oversteer control in conjunction with an ESC control intervention. When the oversteer tendency of the vehicle begins, the front wheel pointing in the deflection direction of the vehicle is actively braked. In the event of a malfunction of the first functional unit 110, this braking can be undertaken by the second functional unit 120. For this purpose, the stability control function 180'B of the control device 180' activates the hydraulic system HS2 and in particular the brake pressure generator 188 (see FIG. 1) in a suitable manner in order to build up a brake pressure at the affected front wheel brake VL, VR. The sensor signals evaluated in this connection by the stability control function 180'B relate, for example, to a vehicle yaw rate, a vehicle lateral acceleration and/or the steering angle. If electrical parking brake actuators are likewise fitted to the front wheels, the stability control function 180'B can also activate them via the actuator control 180'C, in order to achieve oversteer control by braking the corresponding front wheel.

A third activation scenario for a vehicle-stabilizing brake force regulation in the event of a malfunction of the first functional unit 110 is an understeer control. When the understeer of the vehicle begins, typically the inside rear wheel is actively braked, among other measures. Since the second functional unit 120 cannot build up brake pressure at the rear axle by means of the brake pressure generator 188 (see FIG. 1), the parking brake actuator EPB1, EPB2 of the inside rear wheel is activated by the stability control function 180'B and the actuator control 180'C for the understeer control. As already stated above in connection with the oversteer control, the stability control function 180'B for this purpose processes sensor signals relating to the yaw rate, the lateral acceleration and/or the steering angle of the vehicle.

A fourth activation scenario in the event of a malfunction of the first functional unit 110 relates to joint brake force boosting by the brake pressure generator 188 and by the parking brake actuators EPB1, EPB2 in the event that a driver in PT mode or otherwise (for example in the case of a different configuration of the braking system 100) is directly responsible for building up brake pressure at the wheel brakes. This also includes the case where a driver enters into routine braking initiated by the second functional unit 120.

In order to assist the driver, according to the fourth activation scenario the brake pressure at the front wheels is boosted proportionally to the driver's intention by means of the brake pressure generator 188. In this connection, the front wheels can further continue to be slip-controlled to a limited extent, in particular by suitable activation of the brake pressure generator 188 in such a manner that the boosted brake pressure always lies below the slip limit (that is to say by reducing a boost factor). Such limited slip control is, however, possible only as long as the unboosted driver pressure remains below the wheel-lock limit.

Similarly, brake force boosting of the driver's intention can also be carried out at the rear axle by means of the parking brake actuators EPB1, EPB2. For this purpose, a brake force component proportional to the brake pressure requested by the driver is generated by controlled closure of the parking brake actuators EPB1, EPB2 on the part of the basic brake function 180'A and the actuator control 180'C.

Figure 3:
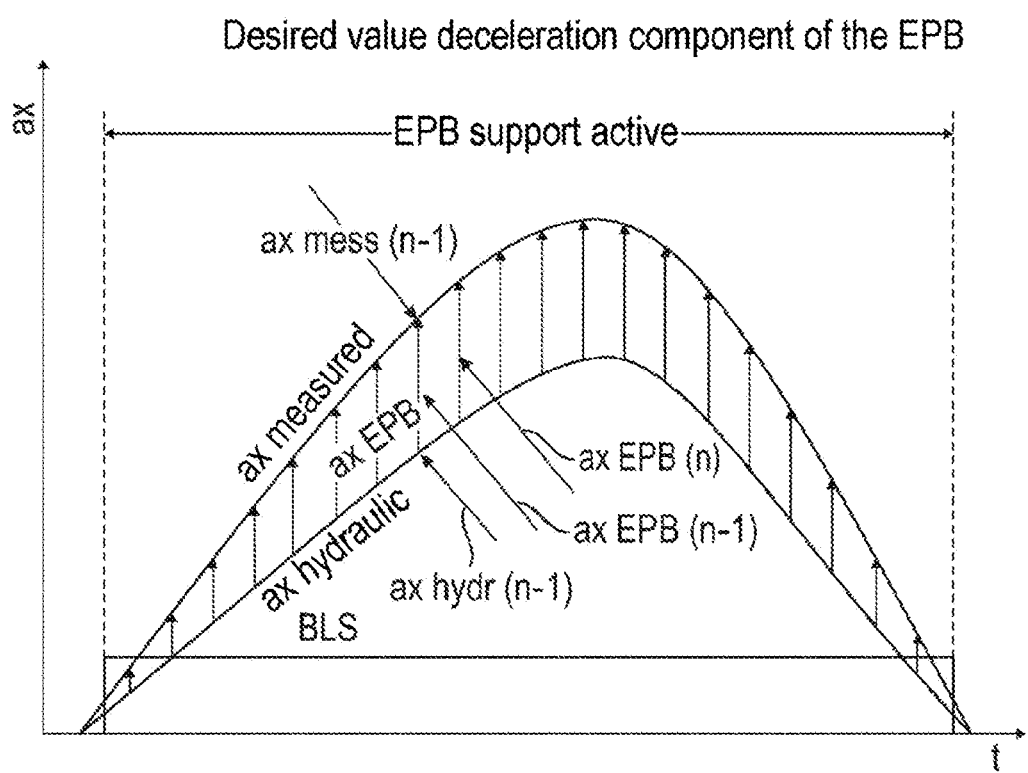
FIG. 3 is a schematic representation of EPB-assisted braking.

FIG. 3 shows, in a schematic diagram, how the boosting of the hydraulic pressure generated by the driver can be carried out by means of the parking brake actuators EPB1, EPB2 in the event of a malfunction of the first functional unit 110. Activation of the parking brake actuators EPB1, EPB2 takes place on the part of the basic brake function 180'A on recognition of a vehicle deceleration requested by the driver at the brake pedal 130 (e.g. in PT mode or in another operating state). For this purpose, the signal of the pedal travel sensor 182 or of the brake light switch 212 can be evaluated.

In the example shown in FIG. 3, the signal of the brake light switch 212 is used. The desired value of the electromechanical assistance is thereby determined on the basis of the measured vehicle longitudinal deceleration ax_mess. For this purpose, the basic brake function 180'A evaluates the corresponding signal of the acceleration sensor 210. The required deceleration component ax_soll_EPB(n) at time n resulting from the parking brake actuators EPB1, EPB2 is thereby determined on the basis of an iterative algorithm. Specifically, the following algorithm, for example, can be used in this connection:

$$ax\_hydr(n-1)=[ax\_mess(n-1)-ax\_EPB(n-1)]$$
$$ax\_soll\_EPB(n)=ax\_hydr(n-1)*EPB\_Gain,$$

wherein ax_hydr(n−1) is a hydraulic deceleration component determined for the time n−1, for example, on the basis of a pressure signal of the sensor 196, ax_mess(n−1) is a vehicle deceleration prevailing at time n−1, and EPB_Gain is a boost factor. This iterative algorithm is illustrated in FIG. 3. It can clearly be seen that the measured total deceleration ax_mess is composed of a hydraulic deceleration component and a deceleration component resulting from the actuation of the parking brake actuators EPB1, EPB2.

To take account of any downhill driving torque present, which can falsify the measurement of the acceleration sensor 210, compensation for a gradient component present in the output signal of the acceleration sensor 210 is possible. This gradient component can be compensated for, for example, using a measured angle of inclination.

The activation, illustrated in FIG. 3, of the parking brake actuators EPB1, EPB2 can take place according to a slip control. In this connection, the boost factor EPB_Gain, for example, can be so reduced, depending on the situation, that the wheel-lock limit of an affected wheel is not exceeded. However, such a procedure is only successful as long as the unboosted driver pressure at the rear wheel brakes HL, HR is below the wheel-lock limit. If the unboosted driver pressure reaches or exceeds the wheel-lock limit, however, another measure for slip control must be taken. Specifically, in the present exemplary embodiment according to FIGS. 1 and 2, an activation of the rear axle isolating valves 170, 170' by the second functional unit 120 is provided in this case for increasing stability, in order to limit the rear axle brake pressure provided by the driver for slip control. Owing to the malfunction of the first functional unit 110, the valves 170, 170' can generally no longer be closed by the control device 180.

In order to allow the valves 170, 170' to be closed by the control device 180' in the event of a malfunction of the control device 180, the switching device U3 is provided (see FIG. 2). The switching device U3 is configured as a transistor-based switchover device and, in dependence on the operability of the first functional unit 110, couples either the control device 180 of the first functional unit 110 or the control device 180' of the second functional unit with the two valves 170, 170', in order to permit activation of those valves 170, 170' by the corresponding control device 180 or 180'. For this purpose, separate activation lines between the control device 180' and the switching device U3 can be provided. Switching of the switching device U3 between the control device 180 and the control device 180' can be initiated by the control device 180' or another component (e.g. the control device 180) which is capable of detecting a malfunction of the first functional unit 110.

The activation of one or both valves 170, 170' takes place in the event of a malfunction of the first functional unit 110 by the stability control function 180'B and in dependence on a velocity of the associated rear wheel, which was detected by the corresponding sensor 206, 208. The stability control function 180'B can in this connection use a conventional ABS control algorithm in order to prevent the corresponding rear wheel from locking.

In the exemplary embodiment outlined above, a brake pressure generated by the driver is limited by closing one or both of the valves 170, 170' by the control device 180'. In the same manner, it would of course also be possible to limit an incorrect brake pressure generated by the brake pressure generator 132, for example in the event of a fault.

In addition to the switching device U3, two further switching devices U1, U2 are installed in the braking system 100. These further switching devices U1, U2 allow the brake pedal travel sensor 182 to coupled, in dependence on the operability of the first functional unit 110, either with the control device 180 of the first functional unit 110 or with the control device 180' of the second functional unit 120.

The switching functions discussed hereinbelow with reference to the switching device U1 and the (optional) switching device U2 are not limited to the brake pedal travel sensor 182. Indeed, these switching functions could additionally or alternatively also be provided for one or more of the further sensors, such as, for example, the wheel sensors 202, 204, 206, 208, the acceleration sensor 210 or the brake light switch 212. The switching function proposed here has the advantage that one sensor can be provided for both functional units 110, 120. The sensor as such therefore does not have to be implemented redundantly.

The switching device U1 accordingly makes it possible to couple the pedal travel sensor 182 (and/or another sensor) with the second control device 180' in the event of a malfunction of the first functional unit 110. The output signal S_Ped_extern of the sensor 182 is then fed via a separate line from the switching device U1 to the control device 180' of the second functional unit 120. More precisely, the signal of the switching device U2 is transmitted to the functional unit 120. This switching device U2 (or another component of the second functional unit 120) is configured to couple an output of the switching device U1 (and thus the corresponding sensor signal) with the second control device 180' in dependence on the operability of the first functional unit 110. In other words, an activation, in particular a switchover, of the switching device U1 takes place from the second functional unit 120.

The switching device U2 is therefore designed to couple the signal of the pedal travel sensor 182 with the actual processing electronics (for example a microprocessor) of the control device 180' in dependence on the first functional unit 110. The switching device U2 can be integrated into an electronics assembly group of the second control device 180'. In the same manner, the switching device U1 can be integrated into an electronics assembly group of the control device 180.

The switching device U1 or another switching device is further configured to couple the sensor 182 (and/or another sensor) either with a first power supply or with a second power supply that is provided in addition to the first power supply. The first power supply is thereby associated with the first functional unit 110 and the second power supply is associated with the second functional unit 120. The corresponding switchover of the power supply can again take place by the switching device U2. For this purpose, two power supply lines extend from the switching device U2 to the switching device U1.

Owing to the provision of the switching device U1 and the switching device U2, the signal of the pedal travel sensor 182 (and/or of another sensor) is always available for the fallback level in the second functional unit 120, even in the event of a failure of the power supply of the first functional unit 110 or in the event of a failure of the control device 180. If the switching device U1 itself is no longer working properly, for example as a result of the ingress of water or a mechanical fault of an electronics assembly group, the pedal travel signal must be dispensed with. However, the second functional unit 120 can use a different sensor as a substitute, for example the pressure sensor 196, in order to detect the corresponding driver braking intention. In the case of another partial failure of the first functional unit 110, for example of the hydraulic system HS1, while the control device 180 continues to function, the transmission of the sensor signal from the first functional unit 110 to the second functional unit 120 can also take place via a vehicle bus, for example the CAN bus marked in FIG. 2.

In general, the redundancy created by the second functional unit 120 offers an improvement in terms of safety which makes the braking system 100 presented herein suitable, for example, also for applications of autonomous or semi-autonomous driving (e.g. in a RCP mode). In particular, in the event of failure of the first functional unit 110 and in the absence of driver intervention at the (optional) brake pedal 130, the vehicle can still be brought safely, that is to say including a vehicle-stabilizing brake pressure regulation which may be necessary, to a stop by means of the second functional unit 120 (and optionally the parking brake actuators EPB1, EPB2).

Also, for example in the event of failure of a separate power supply for the first functional unit 110 (in particular for the electrical pressure generator 132), a lack of operability of the first functional unit 110 can be recognized. If the requirement for brake pressure regulation at one of the wheel brakes VL and VR is detected in this state (e.g. the necessity for an ESC intervention), this is then carried out by means of the second functional unit 120, for which a separate power supply is provided (and optionally using the parking brake actuators EPB1, EPB2).

In a further example, the failure of the first functional unit 110 (e.g. a mechanical failure of the gear 142 of the pressure generator 132) can mean that the vehicle is to be braked to a stop immediately and automatically. If ABS control is required during this braking, this is undertaken by the second functional unit 120 (and optionally the parking brake actuators EPB1, EPB2).

The invention claimed is:

1. A hydraulic motor vehicle braking system, comprising:
a first functional unit having
at least one first valve arrangement, which is configured either to connect at least one first wheel brake, which is associated with a first axle, to a prevailing hydraulic pressure or to separate it therefrom;
at least one second valve arrangement, which is configured either to connect at least one second wheel brake, which is associated with a second axle, to a prevailing hydraulic pressure or to separate it therefrom;
at least one first electrical brake pressure generator, by means of which a brake pressure can be generated at each of the at least one first and the at least one second wheel brake; and
a first controller, which is configured to activate the at least one first electrical brake pressure generator for a brake pressure regulation;
a second functional unit downstream of the first functional unit having at least one second electrical brake pressure generator, by means of which a brake pressure can be generated at least at the at least one second wheel brake; and
a second controller, which is configured to activate the at least one second electrical brake pressure generator for a brake pressure regulation at least at the at least one second wheel brake in the event of a malfunction of the first functional unit; and
a switching device, which is configured to couple either the first controller or the second controller with the at least one first valve arrangement in dependence on an operability of the first functional unit.

2. The braking system as claimed in claim 1, wherein the switchover device is configured to couple the second controller with the at least one first valve arrangement in the event of a malfunction of the first functional unit.

3. The braking system as claimed in claim 1, wherein the second controller is configured to activate the at least one first valve arrangement in dependence on an associated wheel signal.

4. The braking system as claimed in claim 1, wherein the second controller is configured to activate the at least one first valve arrangement within the context of ABS control in order to prevent an associated wheel from locking.

5. The braking system as claimed in claim 1, wherein the second controller is configured to bring the at least one first valve arrangement into a closed position for hydraulic pressure limitation at the associated first wheel brake.

6. The braking system as claimed in claim 5, wherein hydraulic pressure to be limited can be generated in a master cylinder by a driver by means of a brake pedal.

7. The braking system as claimed in claim 5, wherein hydraulic pressure to be limited can be generated by means of activation of the first electrical brake pressure generator by the second controller.

8. The braking system as claimed in claim 1, wherein brake pressure cannot be generated at the at least one first wheel brake by means of the at least one second electrical brake pressure generator.

9. The braking system as claimed in claim 1, wherein the switchover device is configured as a transistor-based circuit.

10. The braking system as claimed in claim 1, wherein the switchover device is integrated into the first functional unit.

11. The braking system as claimed in claim 1, wherein the first controller and the second controller are implemented as separate control devices.

12. The braking system as claimed in claim 1, wherein the braking system comprises at least one electrical parking brake actuator which is configured to generate a brake force at a vehicle wheel; and the second controller is further configured to activate the following individually or together:

the at least one second electrical brake pressure generator; and the at least one electrical parking brake actuator.

13. The braking system as claimed in claim 12, wherein the at least one electrical parking brake actuator is associated with at least one vehicle wheel of the first axle, and the second axle does not have an associated electrical parking brake actuator; and the braking system is configured to generate a brake pressure at the at least one second wheel brake by means of the at least one second electrical brake pressure generator, wherein brake pressure cannot be generated at the at least one first wheel brake by means of the at least one second electrical brake pressure generator.

14. The braking system as claimed in claim 12, wherein the second controller is configured to activate the at least one electrical parking brake actuator for a vehicle-stabilizing brake force regulation.

15. The braking system as claimed in claim 12, wherein the second controller is configured to activate the at least one electrical parking brake actuator for boosting a brake force which results from a hydraulic pressure generated by a driver in a master cylinder by means of a brake pedal.

* * * * *